(12) United States Patent
Park et al.

(10) Patent No.: US 12,447,979 B2
(45) Date of Patent: Oct. 21, 2025

(54) VEHICLE AND CONTROL METHOD THEREOF

(71) Applicants: Hyundai Motor Company, Seoul (KR); Kia Corporation, Seoul (KR); Yura Corporation Co., Ltd., Seongnam-si (KR)

(72) Inventors: Sehoon Park, Yongin-si (KR); In Sic Kim, Incheon (KR); Taewon Lim, Yongin-si (KR)

(73) Assignees: HYUNDAI MOTOR COMPANY, Seoul (KR); KIA CORPORATION, Seoul (KR); YURA CORPORATION CO., LTD, Seongnam-si (KR)

( * ) Notice: Subject to any disclaimer, the term of this patent is extended or adjusted under 35 U.S.C. 154(b) by 814 days.

(21) Appl. No.: 17/720,448

(22) Filed: Apr. 14, 2022

(65) Prior Publication Data
US 2022/0371608 A1 Nov. 24, 2022

(30) Foreign Application Priority Data
May 21, 2021 (KR) .................. 10-2021-0065498

(51) Int. Cl.
*B60W 50/029* (2012.01)
*B60W 50/02* (2012.01)
*B60W 60/00* (2020.01)

(52) U.S. Cl.
CPC ...... *B60W 50/029* (2013.01); *B60W 50/0205* (2013.01); *B60W 60/0015* (2020.02); *B60W 2050/021* (2013.01); *B60W 2050/0292* (2013.01); *B60W 2510/244* (2013.01)

(58) Field of Classification Search
CPC .......... B60W 50/029; B60W 50/0205; B60W 60/0015; B60W 2050/021; B60W 2050/0292; B60W 2510/244; B60W 60/0053; B60W 30/18; B60W 30/181; B60W 50/02; B60W 2520/04; Y02T 10/70; B60R 16/005; B60R 16/023; B60R 16/0231; B60R 16/0232; B60R 16/0238; B60R 16/03; B60R 16/033; B60Y 2300/18091
See application file for complete search history.

(56) References Cited

U.S. PATENT DOCUMENTS

| | | | |
|---|---|---|---|
| 2017/0080925 A1* | 3/2017 | Demmerle | B60W 20/50 |
| 2017/0225635 A1* | 8/2017 | Obayashi | F02B 39/10 |
| 2019/0369635 A1* | 12/2019 | Kobayashi | G05D 1/0246 |
| 2020/0023837 A1* | 1/2020 | Yokoi | B60W 30/0956 |
| 2021/0066956 A1* | 3/2021 | Izawa | H02J 7/0063 |
| 2021/0078599 A1* | 3/2021 | Yu | G08G 1/165 |
| 2021/0237670 A1* | 8/2021 | Takahara | H02J 9/06 |
| 2021/0276425 A1* | 9/2021 | Gauthier | H02J 7/0063 |

* cited by examiner

*Primary Examiner* — Nha T Nguyen
(74) *Attorney, Agent, or Firm* — SLATER MATSIL, LLP

(57) ABSTRACT

An embodiment vehicle includes a battery, a switch configured to identify whether a state of a power of the vehicle is in a normal state or an abnormal state by monitoring the power of the vehicle and to control a supply of a battery power of the battery based on the state of the power being in the abnormal state, and a controller configured to control the vehicle based on the supply of the battery power.

17 Claims, 8 Drawing Sheets

VEHICLE AND CONTROL METHOD THEREOF

CROSS-REFERENCE TO RELATED APPLICATIONS

This application claims the benefit of Korean Patent Application No. 10-2021-0065498, filed on May 21, 2021, which application is hereby incorporated herein by reference.

TECHNICAL FIELD

The disclosure relates to a vehicle and a control method thereof.

BACKGROUND

In general, in the event of a vehicle breakdown, it is recommended to move the vehicle to a safe place and maintain a main function of the vehicle.

However, in a vehicle having a single power system, e.g., a vehicle to which a self-driving system is applied, when the power system is malfunctioning, such recommendations may not be implemented.

For example, main controllers of the vehicle to which a self-driving system is applied, e.g., an anti-lock brake system (ABS), an airbag control unit (ACU), a body control module (BCM), an immobilizer (IMMO), an electronic control unit (ECU) and/or a motor driven power steering (MDPS) may operate in an ignition (IGN) power state. When a power system fails, however, the main controllers may not operate normally.

Although a power supply device such as a battery may be separately added to the vehicle to which a self-driving system is applied, a power change device such as a separate keyset or smartkey (SMK) control device is required in a power element such as the power state of an accessory (ACC) and an ignition.

SUMMARY

An embodiment of the disclosure provides a vehicle and a control method thereof that may move the vehicle in motion to a safe place out of a driving lane through a power redundancy of the vehicle in an event of emergency of the vehicle, and maintain a vehicle system normally even in the emergency.

For instance, when a main power of a vehicle including a self-driving system fails, the vehicle and the control method thereof may control the vehicle by supplying power to a controller of the vehicle based on a battery power of a battery (also referred to as a backup power).

Additional embodiments of the disclosure will be set forth in part in the description which follows and, in part, will be obvious from the description, or may be learned by practice of the disclosure.

According to an embodiment of the disclosure, there is provided a vehicle including a battery, a switch configured to identify whether a state of a power of the vehicle is in a normal state or an abnormal state by monitoring the power of the vehicle, and control a supply of a battery power of the battery, based on the state of the power being in the abnormal state, and a controller configured to control the vehicle based on the supply of the battery power.

The vehicle further includes a voltage converter configured to supply the power, wherein the switch is configured to identify a voltage of the voltage converter, identify whether the state of the power is in the normal state or the abnormal state based on the voltage of the voltage converter, and control the battery power of the battery to be supplied to the controller.

The switch is configured to identify that the state of the power is in the abnormal state, based on the voltage of the voltage converter being out of a preset reference voltage range for more than a predetermined number of times.

The switch is configured to identify that the state of the power of the vehicle is in the abnormal state, further based on the ignition power and the accessory power of the battery not being supplied.

The switch is configured to identify that the state of the power of the vehicle is in the normal state based on the at least one of the ignition power or the accessory power of the battery being supplied.

The controller is configured to control the vehicle in motion to pull over on a shoulder of a driving lane based on the battery power.

According to an embodiment of the disclosure, there is provided a control method of a vehicle, the control method including identifying whether a state of a power of the vehicle is in a normal state or an abnormal state by monitoring the power of the vehicle, controlling a battery power of a battery of the vehicle to be supplied to a controller, based on the state of the power being in the abnormal state, and controlling the vehicle in response to the battery power being supplied to the controller.

The power includes a power supplied from a voltage converter of the vehicle, and the identifying of whether the state of the power is in the normal state or the abnormal state includes identifying a voltage of the voltage converter and identifying whether the state of the power is in the normal state or the abnormal state based on the voltage of the voltage converter.

The identifying of whether the state of the power is in the normal state or the abnormal state includes identifying that the state of the power is in the abnormal state, based on the voltage of the voltage converter being out of a preset reference voltage range for more than a predetermined number of times.

The control method further includes identifying whether at least one of an ignition power or an accessory power of the battery is supplied, and the identifying of whether the state of the power is in the normal state or the abnormal state includes identifying that the state of the power of the vehicle is in the abnormal state, further based on the ignition power and the accessory power of the battery not being supplied.

The identifying of whether the state of the power is in the normal state or the abnormal state includes identifying that the state of the power of the vehicle is in the normal state, based on the at least one of the ignition power or the accessory power of the battery being supplied.

The controlling of the vehicle includes controlling the vehicle in motion to pull over on a shoulder of a driving lane.

BRIEF DESCRIPTION OF THE DRAWINGS

These and/or other aspects of embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Like reference numerals throughout the specification denote like elements. Also, this specification does not describe all the elements according to embodiments of the disclosure, and descriptions well-known in the art to which the disclosure pertains or overlapped portions are omitted. The terms such as "—part", "—device", "—module", and the like may refer to a unit for processing at least one function or act. For example, the terms may refer to at least a process processed by at least one hardware or software. According to embodiments, a plurality of "~parts", "~devices", or "~modules" may be embodied as a single element, or a single "~part", "~device", or "~module" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Embodiments of the disclosure provide a technology that, in an event of emergency in a vehicle such as a self-driving vehicle, may move the vehicle in motion to a safe place out of a driving lane through a power redundancy. For instance, in an event of a failure of a self-driving vehicle, the disclosure provides a technology that may move the vehicle to a safe place while operating a main system of the vehicle for a predetermined period of time.

Hereinafter, an operation principle and embodiments will be described in detail with reference to the accompanying drawings.

Figure 1:
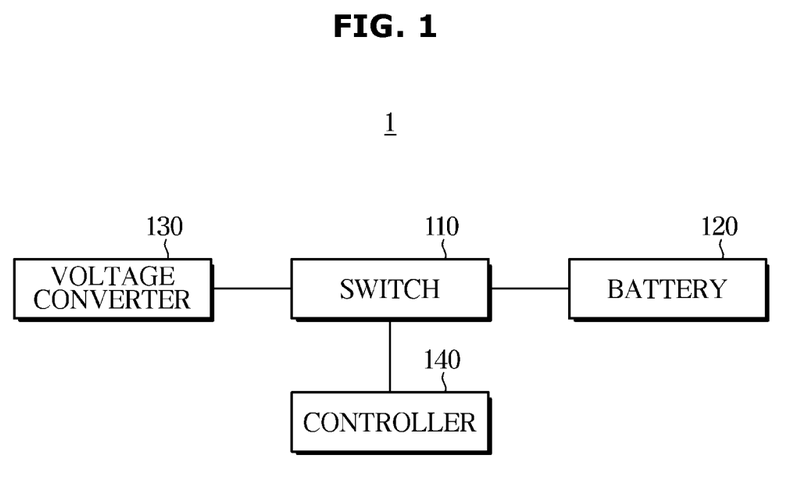
FIGS. 1 and 2 are block diagrams of a vehicle according to an embodiment.
Figure 2:
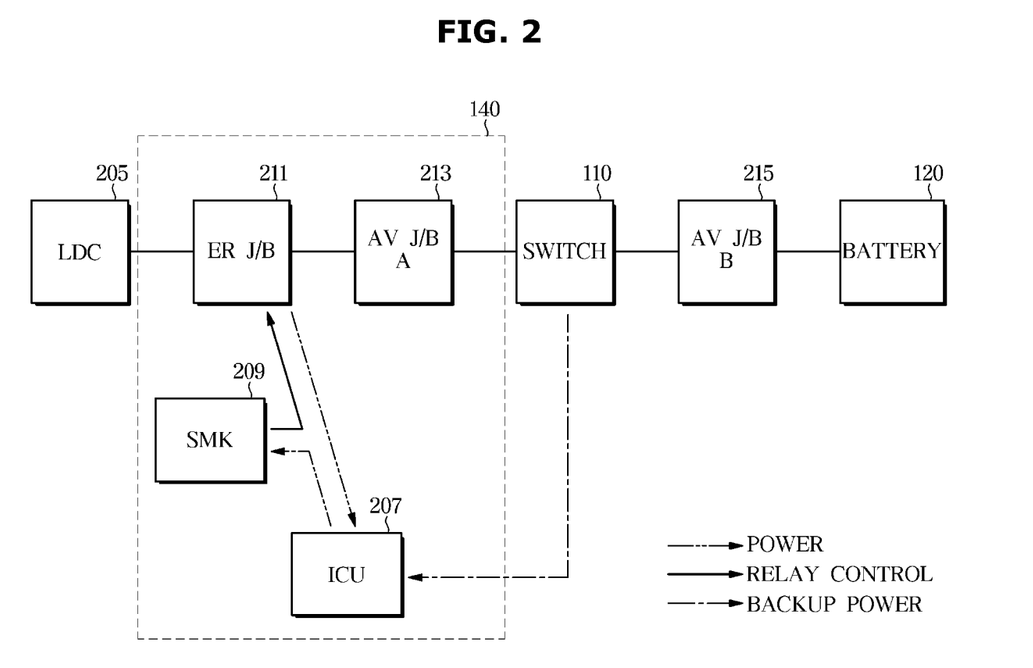

FIGS. 1 and 2 are block diagrams of a vehicle 1 according to an embodiment.

Referring to FIGS. 1 and 2, the vehicle 1 may include a switch no, a battery 120, a voltage converter 130 and/or a controller 140.

The switch no may be referred to as a back to back switch, i.e. a B to B switch. The switch no may be mounted inside the vehicle 1 and manage a power grid between the voltage converter 130 and the battery 120.

The switch no may be turned off when an error such as a short circuit between the voltage converter 130 and the battery 120 occurs, and perform a function of separating the power grid (a function of replacing a role of an existing fuse).

The switch no may perform a control operation capable of responding to an emergency by monitoring an internal power of the vehicle 1.

For instance, the switch no may monitor a power state of the vehicle 1, e.g., a state of a power transferred from the voltage converter 130 and/or a power of the battery 120, in real time. Also, the switch no may identify whether the power state (also referred to as a power system) of the vehicle 1 is in a normal state or an abnormal state, based on the monitoring of the power state of the vehicle 1.

When the power state of the vehicle 1 is in the abnormal state, the switch no may control a battery power of the battery 120 to be supplied.

For example, the power state of the vehicle 1 may be in the abnormal state, when a portion of a power supply part of the vehicle 1 is disconnected (also referred to as a short).

For example, the switch no may control the battery 120 so that the battery power (also referred to as a backup power) of the battery 120, i.e. a redundancy power, is supplied to the controller 140 in order to ensure a safety of the power of the vehicle 1.

The battery 120 may store energy and supply electric power to at least one device (also referred to as a constituent component) of the vehicle 1.

For instance, the battery 120 may be charged based on a rotational force of an engine of the vehicle 1 and supply electric power to the at least one device of the vehicle 1. Also, the battery 120 may be charged by receiving power delivered from the voltage converter 130 under control of the switch no.

The voltage converter 130 may supply power to the at least one device of the vehicle 1.

The voltage converter 130 may convert a high voltage of the battery 120 of the vehicle 1 into a low voltage (e.g., 12V) to supply electric power to the at least one device of the vehicle 1.

The voltage converter 130 may include a converter such as a low voltage direct current to direct current converter (LDC) 205 shown in FIG. 2.

Electric power supplied from the voltage converter 130 may be referred to as a LDC power.

The controller 140 may control at least one other constituent component (e.g., a device and/or a software (a software program)), and perform various data processing and calculations.

The controller 140 may include an integrated central control unit (ICU) 207, a smart key system (SMK, also referred to as an electronic control unit) 209, an engine room junction block (ER J/B) 211, and/or an autonomous vehicle junction block (AV J/B) A 213.

The ICU 207 may be supplied with power through the voltage converter 130 and transfer the supplied power to each load device.

The ICU 207 may be supplied with power through the ER J/B 211 and transfer the supplied power to the SMK 209.

The SMK 209 may be electrically connected to the LDC 205 and the switch 110 through the ER J/B 211.

The SMK 209 may perform a relay control, i.e. a control operation to enable power to be supplied to each of the load devices of the vehicle 1.

The battery 120 may output power such as a battery power, an accessory power, an ignition power and/or a starting power, under control of the SMK 209.

The battery power may be a constant power. The battery power may be applied even when an ignition key of the vehicle 1 is in an 'off' state, i.e., regardless of whether the vehicle 1 is started. The above-described application state of the battery power may be referred to as a battery power state.

For example, the battery power may be power applied to a brake light and/or an interior light, etc.

The accessory power may be power applied to the at least one load device of the vehicle 1, when the ignition key of the vehicle 1 is in an accessory (ACC) position.

For instance, the accessory power may be power applied to the at least one load device of the vehicle 1, even when the vehicle 1 is not started. The above-described application state of the accessory power may be referred to as an accessory power state.

For example, the accessory power may be power applied to a car audio, a cigarette lighter jack, and the like.

The ignition power may be power applied when the vehicle 1 is not started but the ignition key is in 'on' position. For instance, the ignition power may include a first ignition power and/or a second ignition power.

The first ignition power may be power applied to the at least one device of the vehicle 1 while a start motor of the vehicle 1 rotates.

The second ignition power may be power applied to the at least one device of the vehicle only when the ignition key of the vehicle 1 is in 'on' position.

The first ignition power may be referred to as an IG1 and/or ignition power, and such application state of the ignition power may be referred to as an ignition power state.

The starting power may be power applied for a short period of time to drive the start motor of the vehicle 1 when the ignition key is in a start (ST) position.

The ER J/B 211 may be electrically connected to the switch 110 through the AV J/B A 213, and the switch no may be electrically connected to the battery 120.

Referring to FIG. 2, the vehicle 1 may further include an autonomous vehicle junction block (AV J/B) B 215. The switch no may be electrically connected to the battery 120 through the AV J/B B 215.

Although it has been described above that the controller 140 according to an embodiment of FIG. 2 includes the ICU 207, the SMK 209, the ER J/B 211, and/or the AV J/B A 213, each of the above-described constituent components may be separately installed or a portion of constituent components may be included in the switch no according to another embodiment.

Figure 3:
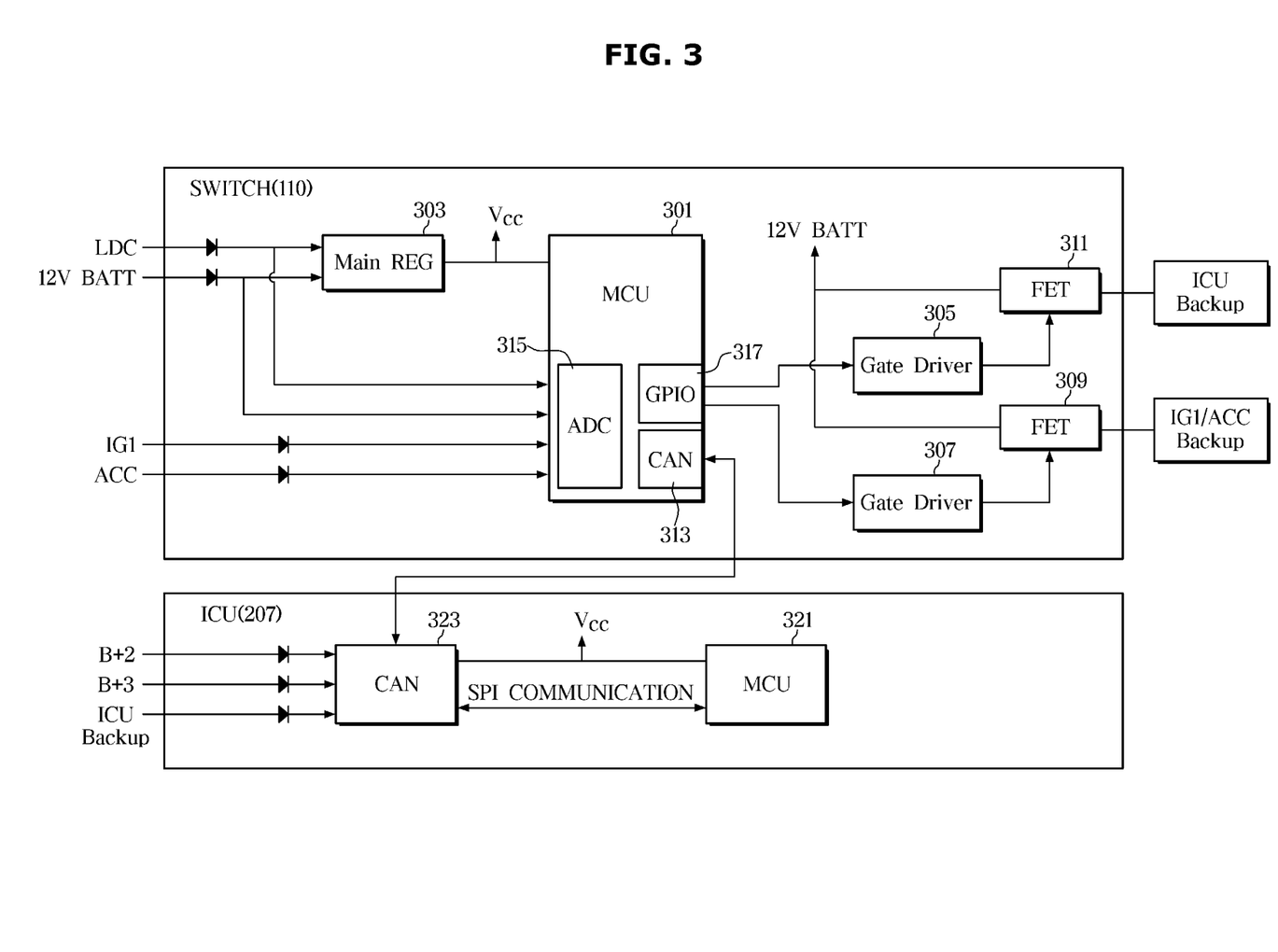
FIG. 3 is a diagram illustrating a detailed configuration of a switch and an integrated central control unit according to an embodiment.

FIG. 3 is a diagram illustrating a detailed configuration of the switch no and the ICU 207 according to an embodiment.

Referring to FIG. 3, the switch 110 may include a micro control unit (MCU) 301, a main regulator 303, gate drivers 305 and 307, and/or field effective transistors (FETs) 309 and 311.

The MCU 301 may include a controller area network (CAN) controller 313, an analog-digital converter (ADC) 315 and/or a general purpose input output (GPIO) pin 317.

The ICU 207 may include a MCU 321 and/or a CAN controller 323.

The MCU 301 may be supplied with a Vcc voltage by converting electric power (LDC) delivered from the LDC 205 and/or the battery power (12V BIT) delivered from the battery 120 to the Vcc voltage through the main regulator 303.

The MCU 301 may monitor a power state of the vehicle 1 based on the Vcc voltage.

For instance, the MCU 301 may identify that the power state, i.e., a power system of the vehicle 1, is in an abnormal state, when the Vcc voltage is out of a predetermined reference voltage range. When the Vcc voltage is within the predetermined reference voltage range, the MCU 301 may identify that the power state, i.e., the power system of the vehicle 1, is in a normal state.

The MCU 301 may be supplied with an accessory power and/or an ignition power of the battery 120.

The MCU 301 may communicate with the ICU 207, i.e., the CAN controller 323 of the ICU 207, through the CAN controller 313.

The MCU 301 may transmit a message indicating that the power state of the vehicle 1 is in the abnormal state to the ICU 207 through the CAN controller 313.

The MCU 301 may control the gate drivers 305 and 307, based on the power transferred through the LDC 205 being in the abnormal state.

The battery power of the battery 120 may be provided to at least one device of the vehicle 1 based on control of the gate drivers 305 and 307.

For instance, the battery power (ICU backup and/or IGU/ACC backup) of the battery 120 may be provided to the ICU 207 and/or the at least one device of the vehicle 1.

Figure 4:
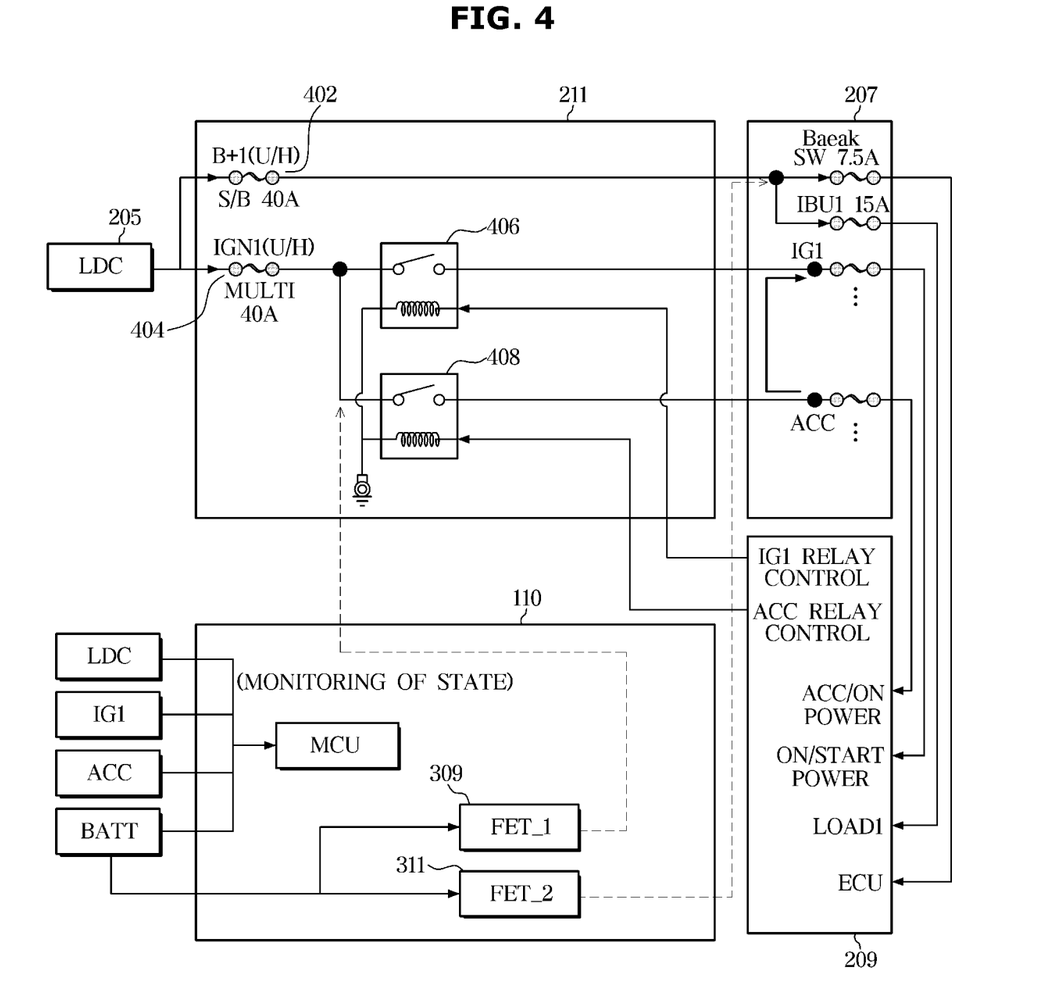
FIG. 4 is a diagram illustrating a control operation of a vehicle according to an embodiment.

FIG. 4 is a diagram illustrating a control operation of the vehicle 1 according to an embodiment.

Referring to FIG. 4, the ER J/B 211 of the vehicle 1 may be supplied with power transferred from the LDC 205, and may supply the power to the ICU 207 through relays 402 and 404 and relays 406 and 408.

The ICU 207 may supply the supplied power to the SMK 209 and/or at least one other device of the vehicle 1.

The SMK 209 may control the relays 402 and 404 of the ER J/B 211. The SMK 209 may identify a supply (also referred to as an input) of an ignition power and/or an accessory power through the ICU 207, in response to the control of the relays 402 and 404.

For instance, the relays 402 and 404 may supply or block the power from the battery 120 to or from the at least one device.

For instance, a control of the relay 406 may include a control for supplying or blocking the ignition power that may be transferred to the SMK 209 through the ER J/B 211. Also, a control of the relay 408 may include a control for supplying or blocking the accessory power that may be transferred to the SMK 209 through the ER J/B 211.

The SMK 209 may identify whether the ignition power is supplied through the ICU 207 according to the control of the relay 406. The SMK 209 may identify whether the accessory power is supplied through the ICU 207 according to the control of the relay 408.

The switch no may be electrically connected to the LDC 205 through the ER J/B 211.

The switch no may identify whether the power transferred from the LDC 205 to the ICU 207 is in a normal state or an abnormal state.

When the power transferred from the LDC 205 to the ICU 207 is in the normal state, the switch 110 may maintain an existing current supply operation.

As shown in FIG. 4, for example, a first field effect transistor FET_1 309 of the switch no may be electrically connected to the ER J/B 211 that connects the LDC 205 and the ICU 207. Also, the second field effect transistor FET_2 311 of the switch no may be electrically connected to the ICU 207.

For instance, as shown in FIG. 4, when the power transferred from the LDC 205 to the ICU 207 is in the normal state, the switch no may maintain an 'off' state of the FET_1309 and the FET_2 311.

According to the embodiment of FIG. 4 described above, when a main power of the vehicle 1 has no error, the vehicle 1 may perform an ongoing operation such as a self-driving operation.

Figure 5:
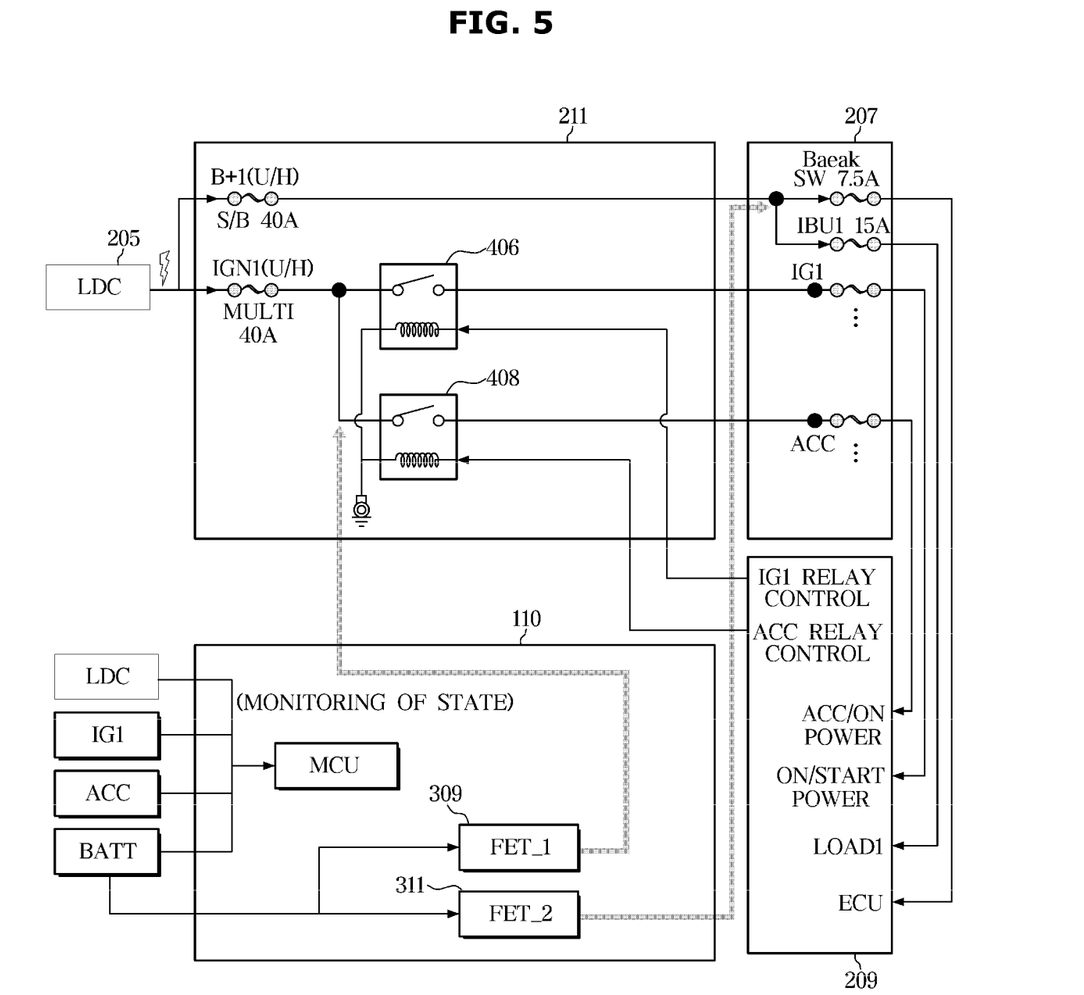
FIG. 5 is a diagram illustrating a control operation of a vehicle according to an embodiment.

FIG. 5 is a diagram illustrating a control operation of the vehicle 1 according to an embodiment.

Referring to FIG. 5, the switch no may monitor a power state of the vehicle 1. The switch no may identify that a power system, i.e., power transferred from the LDC 205, is in an abnormal state, while monitoring the power state of the vehicle 1.

The switch no may perform an emergency mode using a battery power BATT of the battery 120 of the vehicle 1 as an input power, based on the identifying that the power system, i.e., the power transferred from the LDC 205, is in the abnormal state.

As shown in FIG. 5, for instance, the switch no may change the FET 1309 and/or the FET_2 311 electrically connected to a battery power supply terminal of the battery 120 to an 'on' state.

The switch no may supply the battery power of the battery 120 to the ICU 207 that may supply the power to the SMK 209, based on the change to the 'on' state of the FET_2 311.

The switch no may supply the battery power of the battery 120 to the ER J/B 211, e.g., front ends of the relays 402 and 404, based on the change to the 'on' state of the FET_1 309.

The SMK 209 activated based on the change to the 'on' state of the FET_2 311 may perform a control of the relays 402 and 404.

According to the embodiment of FIG. 5 described above, when a main power supply of the vehicle 1 has an error, e.g., when it is identified that the power transferred from the LDC 205 is in the abnormal state, the vehicle 1 may be controlled to be operated as an emergency mode so that the ICU 207 may be supplied with the battery power of the battery 120.

Figure 6:
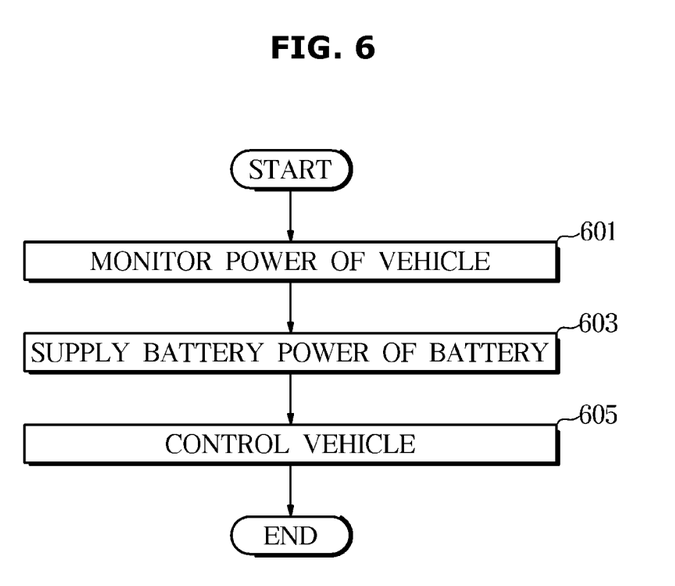
FIG. 6 is a flowchart illustrating operations of a vehicle according to an embodiment.

FIG. 6 is a flowchart illustrating operations of the vehicle 1 according to an embodiment.

The vehicle 1 (and/or the switch 110 of the vehicle 1) may monitor a power of the vehicle 1 (601).

The vehicle 1 (and/or the switch no of the vehicle 1) may supply a battery power of the battery 120 based on the monitoring of the power of the vehicle 1 (603).

The vehicle 1 (and/or the switch 110 of the vehicle 1) may identify a voltage of the voltage converter 130. The vehicle 1 (and/or the switch no of the vehicle 1) may identify whether a power state of the vehicle 1 is in a normal state or abnormal state based on the voltage of the voltage converter 130. The vehicle 1 (and/or the switch no of the vehicle 1) may supply a battery power of the battery 120 to the controller 140 of the vehicle 1, when it is identified that the power state is in the abnormal state.

For instance, the vehicle 1 (and/or the switch no of the vehicle 1) may identify that the power state of the vehicle 1 is in the abnormal state, based on the voltage of the voltage converter 130 being out of a preset reference voltage range for more than a predetermined number of times.

The vehicle 1 (and/or the controller 140 of the vehicle 1) may control the vehicle 1, in response to the supply of the battery power (605).

The vehicle 1 (and/or the controller 140 of the vehicle 1) may control the vehicle 1 to pull over on a shoulder of a driving lane, based on the battery power.

In addition to the above-described embodiment of FIG. 6, the vehicle 1 (and/or the controller 140 of the vehicle 1) may identify whether at least one of an ignition power or an accessory power of the battery 120 is supplied.

The vehicle 1 (and/or the switch no of the vehicle 1) may identify that the power state of the vehicle 1 is in the abnormal state, when the ignition power and the accessory power of the battery 120 are not supplied.

The vehicle 1 (and/or the switch 110 of the vehicle 1) may identify that the power state of the vehicle 1 is in the normal state, based on the at least one of the ignition power or the accessory power of the battery 120 being supplied.

Figure 7:
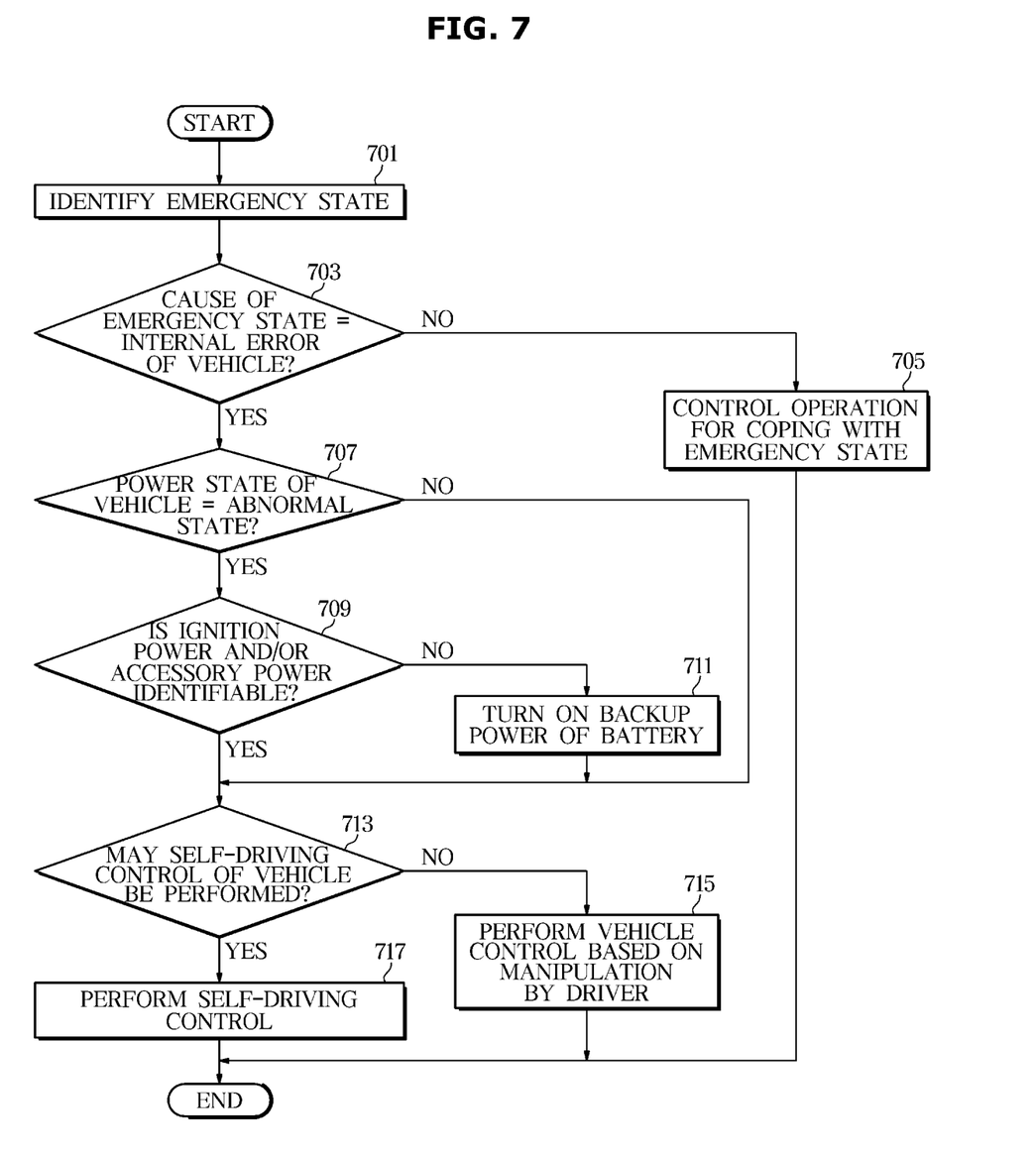
FIG. 7 is a flowchart illustrating operations of a vehicle according to an embodiment.

FIG. 7 is a flowchart illustrating operations of the vehicle 1 according to an embodiment.

The vehicle 1 (and/or the controller 140 of the vehicle 1) may identify an emergency state of the vehicle 1 (701).

The vehicle 1 may identify the emergency state of the vehicle 1 during driving such as a self-driving.

The emergency state of the vehicle 1 may include an external environment error related to the driving of the vehicle 1 and/or an internal error (also referred to as an error of the vehicle 1 itself) of the vehicle 1.

For example, the external environment error of the vehicle 1 may include an identification of a traffic accident in front of the vehicle 1, an identification of an object (person, vehicle, etc.) that is likely to collide with the vehicle 1 in motion, and/or slippage on a road surface due to bad weather, etc.

For example, the internal error of the vehicle 1 may include an error and/or malfunction of at least one device of the vehicle 1, etc.

The vehicle 1 (and/or the controller 140 of the vehicle 1) may identify whether the emergency state of the vehicle 1 is the internal error of the vehicle 1 (703).

The vehicle 1 may identify whether the internal error of the vehicle 1 occurs, based on an output value through at least one sensor, etc., the amount of charge in the battery 120 of the vehicle 1, and/or power supplied to each device of the vehicle 1, etc.

The vehicle 1 may identify whether the external environment error of the vehicle 1 occurs, through the at least one sensor, a camera and/or a lidar of the vehicle 1, etc.

The vehicle 1 may perform an operation 707 when the emergency state of the vehicle 1 is the internal error, and otherwise may perform an operation 705.

The vehicle 1 (and/or the controller 140 of the vehicle 1) may perform a control operation for coping with the emergency state due to the external environment error (705).

When the emergency state is the identification of the traffic accident in front of the vehicle 1 in motion, the vehicle 1 may perform a collision avoidance control and/or a stop control of the vehicle 1, etc.

When the emergency state is the identification of the object that is likely to collide with the vehicle 1 in motion, the vehicle 1 may perform a collision avoidance control, etc.

When the emergency state is the slippage on a road surface, the vehicle 1 may perform a control operation such as deceleration, and the like.

When the emergency state of the vehicle 1 is the internal error, the vehicle 1 (and/or the switch 110 of the vehicle 1) may identify whether the power state of the vehicle 1 is in the abnormal state (707).

Power of the vehicle 1 may be power supplied from the LDC 205 according to the embodiments of FIGS. 1 to 5 described above.

The vehicle 1 may identify a voltage of the power supplied from the LDC 205, and may identify whether the power state of the vehicle 1 is in the abnormal state, i.e., a failure of a power system.

For instance, when the voltage of the power supplied from the LDC 205 is out of a reference voltage range, the vehicle 1 may identify that the power state of the vehicle 1 is in the abnormal state. When the voltage of the power supplied from the LDC 205 is within the reference voltage range, the vehicle 1 may identify that the power state of the vehicle 1 is in the normal state.

When the power state of the vehicle 1 is in the abnormal state, the vehicle 1 may perform an operation 709, and otherwise perform an operation 713 according to the embodiment.

The vehicle 1 (and/or the switch 110 of the vehicle 1) may identify whether an ignition power and/or an accessory power of the vehicle 1 is identifiable (709).

The vehicle 1 may identify whether the ignition power and/or the accessory power of the vehicle 1 is supplied to the SMK 209 according to the embodiments of FIGS. 1 to 5, through the ICU 207.

When the ignition power and/or the accessory power of the vehicle 1 is identified, the vehicle 1 (and/or the switch 110 of the vehicle 1) may perform an operation 713, and otherwise may perform an operation 711.

The vehicle 1 may turn on a backup power of the battery 120 (711).

The backup power of the battery 120 may be the above-described battery power according to the embodiments of FIGS. 1 to 5.

The vehicle 1 may control the switch no so that the battery power of the battery 120 according to the embodiments of FIGS. 1 to 5 may be supplied to the ICU 207.

The vehicle 1 supplies the battery power of the battery 120 to the ICU 207 that may supply the power to the SMK 209, by controlling the switch 110, and thus the battery power may be supplied to the SMK 209.

The vehicle 1 (and/or the controller 140 of the vehicle 1) may identify whether a self-driving control of the vehicle 1 may be performed (713).

When the self-driving control of the vehicle 1 may be performed, the vehicle 1 may perform an operation 717, and otherwise may perform an operation 715.

The vehicle 1 (and/or the controller 140 of the vehicle 1) may perform a vehicle control based on manipulation by a driver (715).

When the self-driving control of the vehicle 1 may not be performed, the vehicle 1 may output corresponding information through an output device such as a speaker and/or a display, so that the driver may recognize that the self-driving control of the vehicle 1 is not performed. Accordingly, the driver may directly manipulate the vehicle 1 for vehicle control.

The vehicle 1 (and/or the controller 140 of the vehicle 1) may perform the self-driving control (717).

The above-described control operations for each of the emergency states in operation 705 of FIG. 7 are embodiments of the disclosure, and existing various control operations for emergency states of the vehicle 1 may also be applied.

Figure 8:
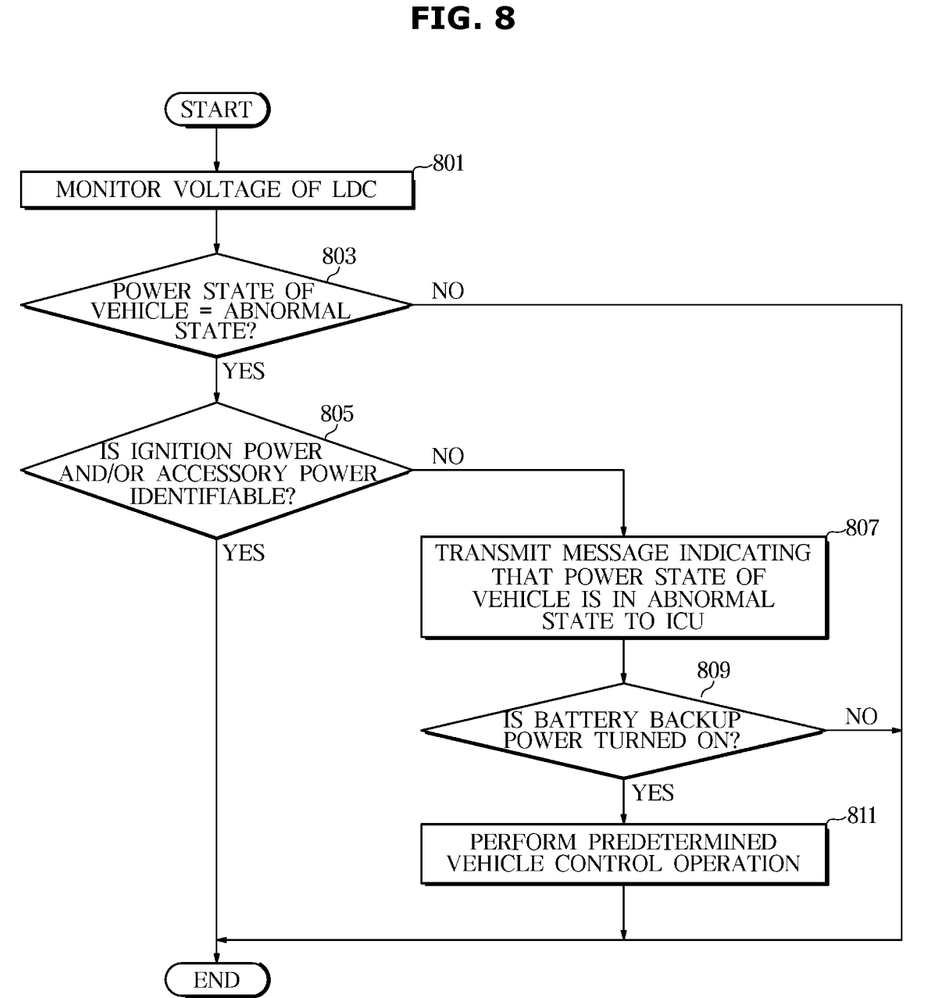
FIG. 8 is a flowchart illustrating operations of a vehicle according to an embodiment.

FIG. 8 is a flowchart illustrating operations of the vehicle 1 according to an embodiment.

The vehicle 1 (and/or the switch no of the vehicle 1) may monitor a voltage of the LDC 205 (801).

The vehicle 1 may monitor the voltage of the LDC 205 for each predetermined period of time, while driving.

The vehicle 1 (and/or the switch no of the vehicle 1) may identify whether a power state of the vehicle 1 is in an abnormal state based on the voltage of the LDC 205 (803).

Power supplied from the LDC 205 may be referred to as a power of the vehicle 1.

The vehicle 1 may identify that the voltage of the LDC 205 being monitored is not a normal voltage.

For instance, when the voltage of the LDC 205 being monitored is out of a predetermined voltage range, the vehicle 1 may identify that the voltage of the LDC 205 is not the normal voltage.

When the vehicle 1 identifies that voltage of the LDC 205 is not the normal voltage consecutively for a predetermined number of times (e.g., 2 to 3 times) or more, the vehicle 1 may identify that a power state of the vehicle 1 is in an abnormal state.

When the power state of the vehicle 1 is in the abnormal state, the vehicle 1 may perform an operation 805, and otherwise may end operations according to the embodiment.

The vehicle 1 (or the SMK 209) may identify whether an ignition power and/or an accessory power is identifiable (805).

The vehicle 1 may identify whether the ignition power and/or the accessory power is supplied to the SMK 209 through the ICU 207.

When the ignition power and/or the accessory power of the vehicle 1 is identified, the vehicle 1 may end the operations according to the embodiment, and otherwise may perform an operation 807.

The vehicle 1 (or the SMK 209) may transmit a message indicating that the power state of the vehicle 1 is in the abnormal state to the ICU 207 (807).

The vehicle 1 (or the ICU 207 and/or the switch 110) may identify whether a battery backup power is turned on (809).

When the battery backup power is turned on, the vehicle 1 may perform an operation 811, and otherwise may end the operations according to the embodiment.

The ICU 207 may identify whether the battery backup power is turned on, based on transmission of a signal to enable the switch no to turn on the battery backup power.

That is, the ICU 207 may transmit the signal to enable the switch no to turn on the battery backup power, and the switch no may turn on the battery backup power based on the signal.

The ICU 207 may control the switch no so that a battery power of the battery 120 may be supplied to the ICU 207.

The vehicle 1 (or the ICU 207) may perform a predetermined vehicle control operation (811).

The vehicle 1 (or the ICU 207) may perform the predetermined vehicle control operation to respond to an emergency state based on the turning on of the battery backup power.

For instance, the predetermined vehicle control operation may include a movement of the vehicle 1.

Power of the switch no and the ICU 207 may be maintained for a predetermined period of time based on the battery power of the battery 120, and the vehicle 1 may control a driving device, a braking device, and/or a steering device, etc. of the vehicle 1, so that the vehicle 1 may be pulled over at a safe location during the predetermined period of time.

As is apparent from the above, according to the embodiments of the disclosure, the vehicle and the control method thereof can maintain a power of a vehicle system such as main controllers of a vehicle such as a self-driving vehicle for a predetermined period of time using a backup power of a battery, when a main power supply of the vehicle fails.

For instance, when a main power supply of a self-driving vehicle fails, the vehicle and the control method thereof can enable the self-driving vehicle to move to a safe place out of a driving lane.

For instance, the vehicle and the control method thereof can provide a power redundancy design that enables temporary backup power to be supplied to a controller (also referred to as a load device) of the vehicle for driving, even after main power of the vehicle is turned off, and thus the vehicle can move to a safe place to prevent a car accident.

For instance, the vehicle and the control method thereof can improve stability and reliability of a power system of the vehicle by implementing redundancy power in the vehicle such as a self-driving vehicle.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and an optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle comprising:
   a battery;
   a switch configured to:
      identify whether a state of a power of the vehicle is in a normal state or an abnormal state by monitoring the power of the vehicle; and
      control a supply of a battery power of the battery based on the state of the power being in the abnormal state;
   a controller configured to control the vehicle based on the supply of the battery power; and
   a voltage converter configured to supply the power of the vehicle,
   wherein the switch is further configured to:
      identify a voltage of the voltage converter;
      identify whether the state of the power is in the normal state or the abnormal state based on the voltage of the voltage converter; and
      control the battery power of the battery to be supplied to the controller.

2. The vehicle of claim 1, wherein the switch is further configured to:
   identify that the state of the power is in the abnormal state based on the voltage of the voltage converter being out of a preset reference voltage range for more than a predetermined number of times.

3. The vehicle of claim 1, wherein the switch is further configured to:
   identify whether an ignition power or an accessory power of the battery is supplied; and
   identify that the state of the power of the vehicle is in the abnormal state based on the ignition power and the accessory power of the battery not being supplied.

4. The vehicle of claim 3, wherein the switch is further configured to:
   identify that the state of the power of the vehicle is in the normal state based on the ignition power or the accessory power of the battery being supplied.

5. The vehicle of claim 1, wherein the controller is further configured to:
   control the vehicle in motion to pull over on a shoulder of a driving lane based on the battery power.

6. A method of controlling a vehicle, the method comprising:
   identifying whether a state of a power of the vehicle is in a normal state or an abnormal state by monitoring the power of the vehicle;
   controlling a battery power of a battery of the vehicle to be supplied to a controller based on the state of the power being in the abnormal state; and
   controlling the vehicle in response to the battery power being supplied to the controller, wherein:
      the power of the vehicle includes a power supplied from a voltage converter of the vehicle; and
      identifying whether the state of the power is in the normal state or the abnormal state comprises:
         identifying a voltage of the voltage converter; and
         identifying whether the state of the power is in the normal state or the abnormal state based on the voltage of the voltage converter.

7. The method of claim 6, wherein identifying whether the state of the power is in the normal state or the abnormal state further comprises:
   identifying that the state of the power is in the abnormal state based on the voltage of the voltage converter being outside of a preset reference voltage range for more than a predetermined number of times.

8. The method of claim 6, further comprising:
   identifying whether an ignition power or an accessory power of the battery is supplied,
   wherein identifying whether the state of the power is in the normal state or the abnormal state further comprises:
      identifying that the state of the power of the vehicle is in the abnormal state based on the ignition power and the accessory power of the battery not being supplied.

9. The method of claim 8, wherein identifying whether the state of the power is in the normal state or the abnormal state further comprises:
   identifying that the state of the power of the vehicle is in the normal state based on the ignition power or the accessory power of the battery being supplied.

10. The method of claim 6, wherein controlling the vehicle comprises controlling the vehicle in motion to pull over on a shoulder of a driving lane.

11. A method of controlling a vehicle, the method comprising:
    determining whether a cause of an emergency state of the vehicle is an internal cause or an external cause;
    in response to determining the cause of the emergency state is the internal cause, determining whether a power state of the vehicle is a normal state or an abnormal state;
    in response to determining the power state of the vehicle is the abnormal state, controlling a battery power of a battery of the vehicle to be supplied to a controller; and controlling the vehicle in response to the battery power being supplied to the controller,
wherein determining whether the power state of the vehicle is the normal state or the abnormal state comprises:
identifying a voltage of a voltage converter of the vehicle; and
determining the power state of the vehicle based on the voltage of the voltage converter.

12. The method of claim 11, further comprising:
determining that the power state of the vehicle is the abnormal state based on the voltage of the voltage converter being outside of a preset reference voltage range for more than a predetermined number of times.

13. The method of claim 11, further comprising:
determining whether an ignition power or an accessory power of the battery is supplied.

14. The method of claim 13, further comprising:
determining that the power state of the vehicle is the abnormal state based on determining that the ignition power and the accessory power of the battery are not supplied.

15. The method of claim 13, further comprising:
determining that the power state of the vehicle is the normal state based on determining that the ignition power or the accessory power of the battery is supplied.

16. The method of claim 11, wherein controlling the vehicle comprises controlling the vehicle in motion to pull over on a shoulder of a driving lane.

17. The method of claim 11, further comprising:
controlling an operation for coping with the emergency state in response to determining the cause of the emergency state of the vehicle is the external cause.

* * * * *

UNITED STATES PATENT AND TRADEMARK OFFICE
CERTIFICATE OF CORRECTION

| | | |
|---|---|---|
| PATENT NO. | : 12,447,979 B2 | Page 1 of 1 |
| APPLICATION NO. | : 17/720448 | |
| DATED | : October 21, 2025 | |
| INVENTOR(S) | : Park et al. | |

It is certified that error appears in the above-identified patent and that said Letters Patent is hereby corrected as shown below:

On the Title Page

Item (73), in Column 1, in "Assignees", Line 4, delete "LTD," and insert -- LTD., --.

Signed and Sealed this
Ninth Day of December, 2025

John A. Squires
*Director of the United States Patent and Trademark Office*